Jan. 26, 1937.      G. W. DAVIS      2,069,058
SEPTIC TANK
Filed Aug. 17, 1935     2 Sheets-Sheet 1

WITNESSES
Edw. Thorpe
A. L. Kitchin

INVENTOR
George W. Davis
BY
Munn, Anderson & Liddy
ATTORNEYS

Jan. 26, 1937.                G. W. DAVIS                2,069,058
                              SEPTIC TANK
                          Filed Aug. 17, 1935            2 Sheets-Sheet 2
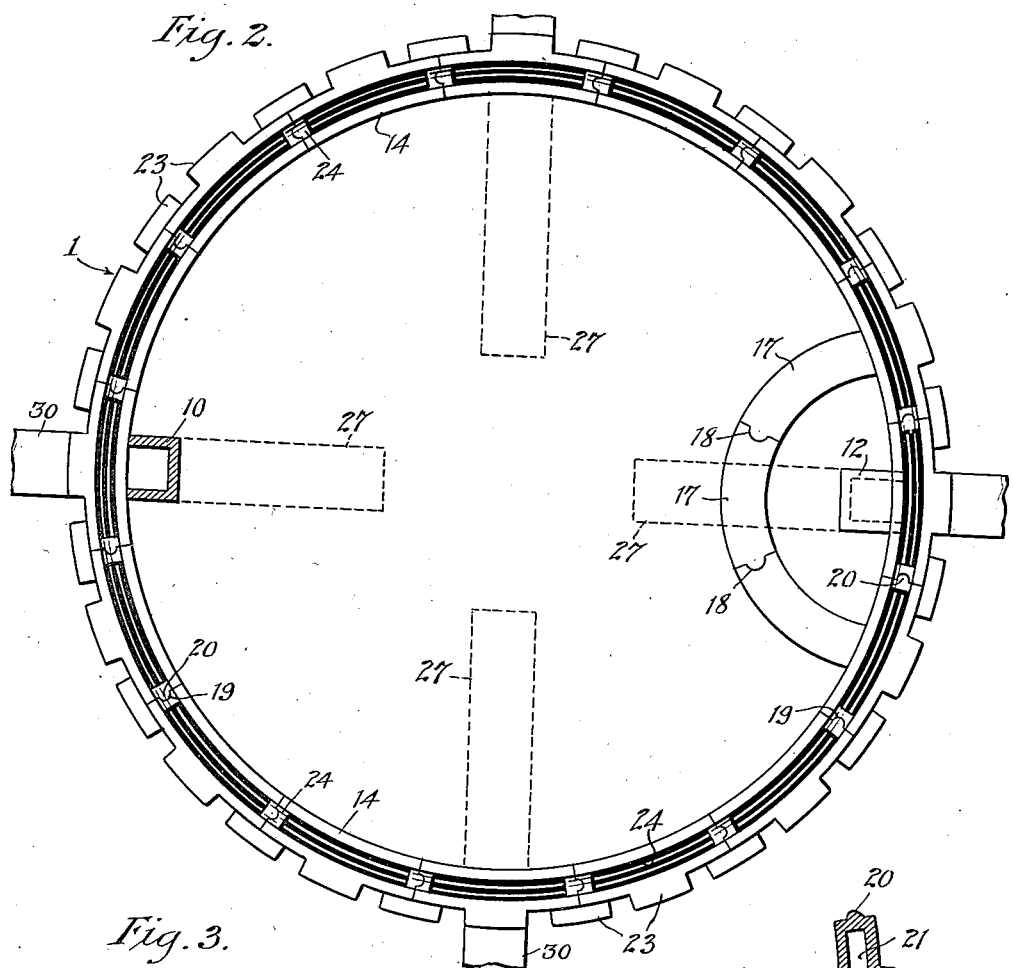
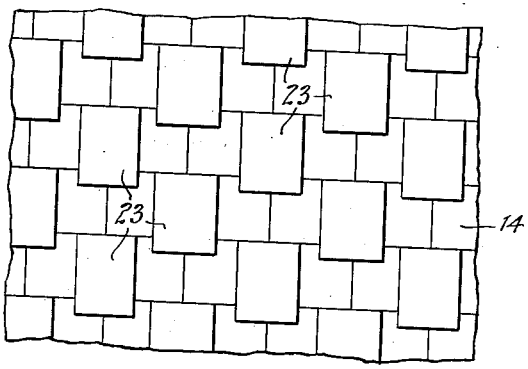
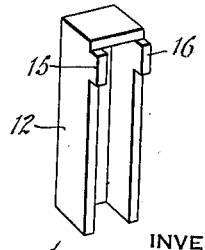
WITNESSES
Edw. Thorpe
A. L. Kitchin
INVENTOR
George W. Davis
BY
Munn, Anderson & Siddy
ATTORNEYS Patented Jan. 26, 1937

2,069,058

UNITED STATES PATENT OFFICE 2,069,058

SEPTIC TANK

George W. Davis, Mineola, N. Y.

Application August 17, 1935, Serial No 36,726

3 Claims (Cl. 210—6)

This invention relates to sewage disposal systems and particularly to an improved septic tank forming a part thereof, an object being to provide a tank which may be of minimum size while giving maximum results.

Another object of the invention is to provide a septic tank wherein the water and gases leaving the tank are discharged or distributed around the entire circumference of the tank and for an appreciable part of its height.

A further object is to provide a septic tank wherein the sewage may be freely discharged therein while the water from the tank is distributed to the ground at the bottom of the tank and to the ground around the tank as far up as the water level in the sludge digestion chamber.

An additional object, more specifically, is to provide a septic tank formed with sides constructed of specially formed tile which will allow water to flow circumferentially and vertically therethrough.

In the accompanying drawings—

Fig. 2 is a horizontal sectional view through the tank shown in Fig. 1, the same being taken on the line 2—2;

Fig. 3 is an exterior elevation of part of the vertical wall of the tank shown in Fig. 1;

Fig. 4 is a fragmentary detail sectional view through Fig. 1 on the line 4—4;

Fig. 5 is a detail perspective view of an outlet conduit.

Figure 1:
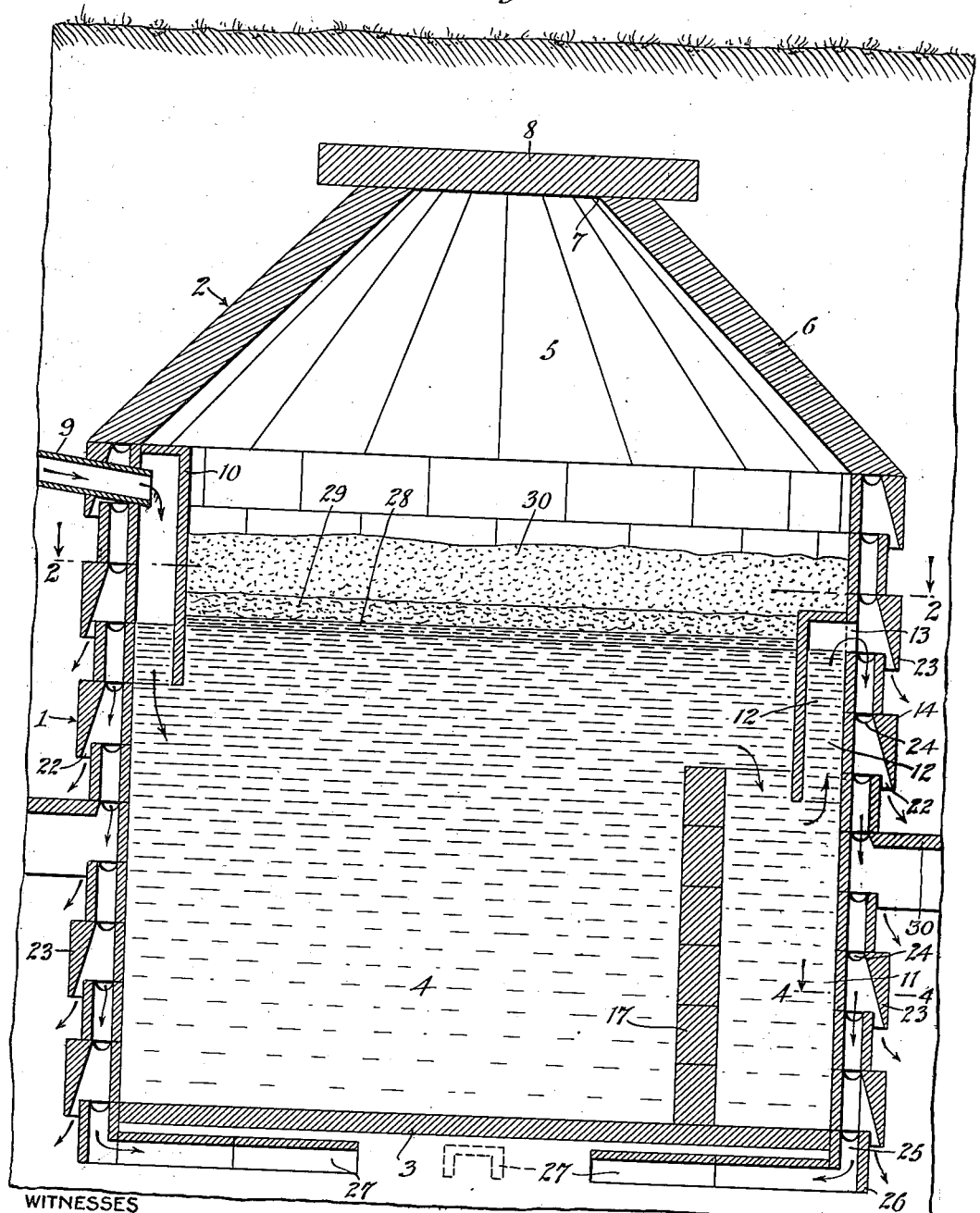
Figure 1 is a view in vertical section illustrating a septic tank showing an embodiment of the invention positioned in the earth ready for use.

Referring to the accompanying drawings by numerals, 1 indicates the tank body as a whole, and 2 the top as a whole which rests on the body 1. Associated with the body 1 is a bottom 3, which may be made of concrete or other desired material so that the interior of the body 1 will be water-tight. By the arrangement just described there will be provided a digestion chamber 4 and an open space or chamber 5 in the top 2. The top 2 is preferably made from truncated triangular-shaped blocks 6 of cement or concrete arranged to rest on the body 1 at the lower end and present an opening 7 at the upper end. A concrete slab 8 rests on top of the blocks 6 so as to close the opening 7. When these parts are placed in position concrete is arranged between the respective blocks and also between the blocks and the slab 8 whereby a substantially water- and gas-tight structure is presented.

After the device has been arranged as shown in Fig. 1, which is preferably several feet below the surface of the earth, it is ready for use. The usual sewage passes into the device through an inlet pipe 9 and then downwardly through an inlet conduit 10 into the chamber 4. From chamber 4 the clear water passes into an effluent chamber 11 and then out through an outlet conduit 12, said outlet conduit 12 being open at the bottom but closed at the sides and top, one side being closed by the body 1 except for the opening 13, whereby the water from the outlet conduit 12 may be discharged into the various blocks 14 forming the body 1. From Fig. 5 it will be seen that the outlet conduit 12 is provided with a pair of ears 15 and 16 which extend into the aperture 13 in one of the blocks 14.

In respect to the inlet pipe 9, one of the blocks 14 is provided with a suitable passageway for accommodating the pipe 9.

The effluent chamber 11 is formed of a number of cement blocks 17 which have interlocking portions as shown at 18 (Fig. 2). These blocks are arc-shaped, also as shown in Fig. 2, and are built up until they overlap the lower end of the outlet conduit 12, whereby all water leaving the chamber 4 first passes into the effluent chamber 11 and then to the outlet conduit 12.

In forming the body 1, the same is built up of a number of identically constructed blocks 14, one of which is shown in section in Fig. 4. In this figure it will be observed that there is provided a recess 19 at one end of the block and a coacting protuberance 20 at the other end of the block. This block is also provided with a chamber 21 merging into an outlet passageway 22 formed by protuberances 23. Also at the top each of the blocks 14 is provided at each end with a notch 24, whereby water may circulate circumferentially as well as pass vertically down to the bottom of the body 1; also water and gases may pass out through the various passageways 22. As illustrated in Fig. 3 the various protuberances 23 are positioned to overlap the next row of blocks, but they are arranged centrally of the respective blocks so that they will not interfere with each other but will present a staggered structure which will also result in the provision of a cavity immediately below each protuberance whereby the water and gases may freely pass out and enter the earth adjacent the tank. Part of the water and gases does not pass out through the various passageways 22 but passes downwardly and moves through the respective passageways 25 of the different tiles 26 and then into the tiles 27. The tiles 26 and 27 are preferably U-shaped in cross section and act to dispose of the water that reaches the bottom of the body. Four of these distributing tiles are provided, as shown in Fig. 2, though, if desired, a greater number might be used or a less number.

It will be understood that practically all of the substance that enters the tank is discharged out into the earth eventually as water or gases. In time there will be a slight sediment settle at the bottom 3, while during the functioning of the tank there usually will be a zone 28 which is known as a grease zone and next to this zone will be the waste zone 29 and above this zone the bacteria mat 30. It will be understood that the use of bacteria in the present invention is no new theory, but the present invention is a new form of septic tank using the bacteria theory and method to secure the best results in disposing of comparatively large volumes of sewage.

It will be understood that the water and gases are discharged throughout all the passageways 22 of the body 1 from the opening 13 downwardly, and, in addition, a certain amount of water and gases passes downwardly and into the tiles 26 and 27, from which they enter the earth. Ordinarily the device will function for many years without any attention, but if for any reason sand, earth, or other material should be discharged into the tank through the pipe 9, said material will form a sediment at the bottom of the tank. This may be removed if the same should become sufficiently great to become objectionable.

The various blocks 14 may be made of any desired material but preferably are made of concrete and are connected together in the usual way of concrete blocks, whereby a strong, firm tank structure is secured while permitting a ready disposal of the water to the surrounding earth.

As indicated, particularly in Figures 1 and 2 conduits 30 could be arranged at any point between the top and bottom of the tank so as to conduct or guide water from the tank to any desired distant point, as, for instance, to a point 15 or 20 feet of the tank. Only four of these conduits 30 have been shown in the drawings, but a greater number could be used without departing from the spirit and scope of the invention. Also these conduits are shown as open at the bottom but this is not necessary though it is the preferable structure.

I claim:
1. A septic tank for sewage disposal, comprising a hollow body having an inlet member near the top and an outlet a short distance above the inlet end of said inlet member but on the diametrically opposite side of said body, and means in the body on the opposite side to said inlet member forming an effluent chamber, a conduit extending from said outlet to a position within said effluent chamber for directing liquid from said effluent chamber to said outlet, said conduit having its inlet end below the inlet of the effluent chamber, said body being provided with a foraminous outer portion into which said conduit discharges whereby the liquid passing from said conduit will be distributed over a wide surface.

2. A septic tank for sewage disposal including a tank structure formed of a wall having a water- and gas-tight interior surface and an exterior surface portion which is hollow and provided with spaced openings and tubes connected to the outer wall surface for directing some of the liquid to positions below the body, said tubes being open on the lower face, inlet means for directing sewage into said body, and outlet means having one end extending appreciably below the inlet end of said inlet means arranged interiorly of the body for directing liquid to said outer wall surface near the top thereof and above the discharge end of said inlet means so that the incoming sewage will not cause the grease and bacteria mats to flow out of said outlet means.

3. A septic tank for sewage disposal comprising a tank provided with inlet and outlet members, the outlet end of said inlet member being below the outlet end of said outlet member, a wall coacting with said tank forming an effluent chamber on the diametrically opposite side of the tank to said inlet member, said wall extending from the bottom of the tank to a point above the inlet end of said outlet member, said outlet member having the inlet end projecting into said effluent chamber, whereby the bacteria mat formed in the tank will not be broken up by sewage entering the tank or by the outflow of liquid from the tank, and means for receiving the liquid from said outlet member, said means acting to distribute the liquid over the outer surface of the bottom and side wall of the tank.

GEORGE W. DAVIS.